US012631067B2

(12) United States Patent
Armenoff et al.

(10) Patent No.: US 12,631,067 B2
(45) Date of Patent: May 19, 2026

(54) LADDER, LADDER TOP AND METHODS

(71) Applicant: Werner Co., Greenville, PA (US)

(72) Inventors: Claire Armenoff, Montgomery, IL (US); Michael T. Melton, Glen Ellyn, IL (US); Weston Van Wambeke, Saverna Park, MD (US)

(73) Assignee: Werner Co., Itasca, IL (US)

( * ) Notice: Subject to any disclaimer, the term of this patent is extended or adjusted under 35 U.S.C. 154(b) by 537 days.

(21) Appl. No.: 18/070,265

(22) Filed: Nov. 28, 2022

(65) Prior Publication Data

US 2023/0167684 A1 Jun. 1, 2023

Related U.S. Application Data

(60) Provisional application No. 63/284,599, filed on Nov. 30, 2021.

(51) Int. Cl.

*E06C 7/00* (2006.01)
*E06C 7/14* (2006.01)
*E06C 7/48* (2006.01)

(52) U.S. Cl.

CPC . *E06C 7/14* (2013.01); *E06C 7/48* (2013.01)

(58) Field of Classification Search

CPC ..... E06C 7/00; E06C 7/14; E06C 7/48; E06C 9/00

See application file for complete search history.

(56) References Cited

U.S. PATENT DOCUMENTS

| | | | |
|---|---|---|---|
| 529,871 | A | 11/1894 | Minier |
| 1,553,279 | A | 9/1925 | Wirth |
| 1,794,700 | A | 3/1931 | McCaskey |
| 1,994,369 | A | 3/1935 | Risser |
| 2,371,433 | A | 3/1945 | Davis |
| 2,398,617 | A | 4/1946 | Casey |
| 2,808,975 | A | 10/1957 | Roland |
| 2,870,948 | A | 1/1959 | Lundgren |

(Continued)

FOREIGN PATENT DOCUMENTS

| | | |
|---|---|---|
| CA | 183088 | 5/2019 |
| DE | 334240 | 3/1921 |

(Continued)

OTHER PUBLICATIONS

Ladder Black Top Cap, Date first available on Aug. 24, 2023, Retrieved from internet [Oct. 4, 2024] URL: https://www.amazon.com/ Louisville-Ladder-Black-FS 1400-PK727 /dp/B0CGKVB6Y8 (Year: 2023).

(Continued)

*Primary Examiner* — Chi Q Nguyen

(74) *Attorney, Agent, or Firm* — Fitch, Even, Tabin & Flannery LLP

(57) ABSTRACT

A ladder top having a front side flange, a rear side flange, a right side flange and a left side flange. The right side flange has a right metal plate through which right fasteners extend into a right front rail and a right rear rail. The left side flange having a left metal plate through which left fasteners extend into a left front rail and a left rear rail. A ladder top with passages for carabiners. Ladders with metal plates on the side flanges, or with passages for carabiners on the ladder top of the ladder. Methods of using a ladder. A method of producing a ladder.

20 Claims, 8 Drawing Sheets

(56) References Cited

U.S. PATENT DOCUMENTS

| | | | | |
|---|---|---|---|---|
| 2,883,184 | A | 4/1959 | Brewington | |
| 3,010,535 | A | 11/1961 | Francisco | |
| 3,062,319 | A | 11/1962 | Wright | |
| 3,156,443 | A | 11/1964 | Lupinacci | |
| 3,477,679 | A | 11/1969 | Lovitz | |
| 3,715,012 | A | 2/1973 | Perry | |
| 3,738,601 | A | 6/1973 | Gehringer | |
| 3,768,592 | A | 10/1973 | Higgins | |
| 3,829,051 | A | 8/1974 | Emmons | |
| 3,887,034 | A | 6/1975 | Sawatzky | |
| 3,915,189 | A | 10/1975 | Holbrook | |
| 4,016,955 | A | 4/1977 | Gates | |
| D248,777 | S | 8/1978 | Spencer | |
| 4,139,664 | A | 2/1979 | Wenrick | |
| 4,176,580 | A | 12/1979 | Gallegos | |
| 4,261,435 | A | 4/1981 | Winter | |
| 4,318,454 | A | 3/1982 | Johnson | |
| 4,363,378 | A | 12/1982 | Williams | |
| 4,653,713 | A | 3/1987 | Hamilton | |
| 4,714,162 | A | 12/1987 | Harrison | |
| 4,858,869 | A | 8/1989 | Stang | |
| 4,862,994 | A | 9/1989 | Hughes, Sr. | |
| 4,899,970 | A | 2/1990 | Berzina | |
| 4,995,578 | A | 2/1991 | Monheim | |
| 5,035,389 | A | 7/1991 | Wang | |
| 5,052,581 | A | 10/1991 | Christ | |
| 5,134,908 | A | 8/1992 | Fisher | |
| 5,150,938 | A | 9/1992 | Gans | |
| 5,158,023 | A | 10/1992 | Allen | |
| D334,240 | S | 3/1993 | Huffine | |
| 5,240,214 | A | 8/1993 | Birnbaum | |
| D340,773 | S | 10/1993 | Bartnicki | |
| 5,259,480 | A | 11/1993 | Bartnicki | |
| 5,263,550 | A | 11/1993 | Jines | |
| 5,267,632 | A | 12/1993 | Mintz | |
| 5,351,730 | A | 10/1994 | Lewellen | |
| 5,358,070 | A | 10/1994 | Bartnicki | |
| 5,370,263 | A | 12/1994 | Brown | |
| 5,419,409 | A | 5/1995 | Corulla | |
| 5,433,416 | A | 7/1995 | Johnson | |
| 5,460,241 | A | 10/1995 | Labelle | |
| 5,503,245 | A | 4/1996 | Etesam | |
| 5,505,302 | A | 4/1996 | Ferley | |
| 5,547,080 | A | 8/1996 | Klimas | |
| D374,937 | S | 10/1996 | Salas | |
| 5,573,081 | A | 11/1996 | Bartnicki | |
| 5,584,357 | A | 12/1996 | Gugel | |
| 5,622,238 | A | 4/1997 | Farmer | |
| 5,622,278 | A | 4/1997 | Fries | |
| 5,628,381 | A | 5/1997 | Markovich | |
| 5,673,885 | A | 10/1997 | Pham | |
| 5,722,507 | A | 3/1998 | Kain | |
| 5,740,883 | A | 4/1998 | Trank | |
| 5,782,314 | A | 7/1998 | Zeitler | |
| 5,810,406 | A | 9/1998 | Reid, Jr. | |
| 5,850,894 | A | 12/1998 | Busenhart | |
| D404,503 | S | 1/1999 | Bell | |
| 5,873,433 | A | 2/1999 | Katz | |
| 5,899,420 | A | 5/1999 | Gerardi | |
| 5,913,380 | A | 6/1999 | Gugel | |
| 5,924,615 | A | 7/1999 | Mcgarrah | |
| 5,941,344 | A | 8/1999 | Spadaro | |
| D413,990 | S | 9/1999 | Bartnicki | |
| 6,024,192 | A | 2/2000 | Griffin | |
| D422,717 | S | 4/2000 | Bartnicki | |
| 6,089,383 | A | 7/2000 | Heneveld | |
| D447,818 | S | 9/2001 | Weber | |
| 6,401,862 | B1 | 6/2002 | Caron | |
| 6,412,601 | B1 | 7/2002 | Schmidt | |
| 6,443,260 | B1 | 9/2002 | Katz | |
| 6,443,261 | B1 | 9/2002 | Gibson | |
| 6,454,050 | B2 | 9/2002 | Gibson | |
| 6,467,577 | B1 | 10/2002 | Charlebois, Jr. | |
| 6,481,583 | B1 | 11/2002 | Black | |
| 6,502,664 | B1 | 1/2003 | Peaker, Sr. | |
| 6,536,557 | B2 | 3/2003 | Gibson | |
| 6,591,941 | B1 | 7/2003 | Mannie | |
| 6,691,825 | B2 | 2/2004 | Haig | |
| 6,729,441 | B1 | 5/2004 | Nahlen | |
| 6,823,998 | B2 | 11/2004 | Fabregas | |
| D500,145 | S | 12/2004 | Cromberg | |
| 6,880,794 | B1 | 4/2005 | Kahn | |
| 6,938,766 | B1 | 9/2005 | Lee | |
| 6,997,282 | B1 | 2/2006 | Sharp | |
| 7,032,711 | B1 | 4/2006 | Katz | |
| 7,063,187 | B1 | 6/2006 | Lavigne | |
| 7,077,238 | B2 | 7/2006 | Butler | |
| D529,871 | S | 10/2006 | Butler | |
| D530,025 | S | 10/2006 | Patton | |
| D531,322 | S | 10/2006 | Patton | |
| 7,128,187 | B2 | 10/2006 | Simpson | |
| 7,159,694 | B2 | 1/2007 | Gibson | |
| D541,433 | S | 4/2007 | Wise | |
| D548,364 | S | 8/2007 | Skubic | |
| D548,855 | S | 8/2007 | Meyers | |
| D549,356 | S | 8/2007 | Gibson | |
| 7,264,084 | B1 | 9/2007 | Switzer | |
| 7,270,307 | B2 | 9/2007 | Zodnik | |
| 7,316,390 | B2 | 1/2008 | Burlison | |
| D564,677 | S | 3/2008 | Farber | |
| 7,341,259 | B1 | 3/2008 | Slabich | |
| D597,685 | S | 8/2009 | Gibson | |
| 7,575,097 | B2 | 8/2009 | Sheridan | |
| D600,820 | S | 9/2009 | Abraham | |
| 7,706,878 | B2 | 4/2010 | Freeman | |
| 7,722,019 | B2 | 5/2010 | Losi, Jr. | |
| 7,753,170 | B1 | 7/2010 | Gibson | |
| D627,487 | S | 11/2010 | Gómez | |
| 7,886,872 | B2 | 2/2011 | Astor | |
| 7,984,790 | B2 | 7/2011 | Meyers | |
| 8,011,476 | B1 | 9/2011 | Alcon | |
| 8,186,481 | B2 | 5/2012 | Moss | |
| D661,406 | S | 6/2012 | Finch | |
| 8,210,313 | B2 | 7/2012 | Astor | |
| 8,272,478 | B2 | 9/2012 | Astor | |
| 8,365,863 | B2 | 2/2013 | Astor | |
| 8,453,796 | B2 | 6/2013 | Astor | |
| 8,511,661 | B2 | 8/2013 | Huang | |
| 8,579,083 | B2 | 11/2013 | Astor | |
| 8,596,454 | B1 | 12/2013 | Carlson | |
| 8,678,366 | B2 | 3/2014 | Bowers | |
| 8,701,831 | B2 * | 4/2014 | Moss | E06C 1/393<br>182/174 |
| 8,777,204 | B2 | 7/2014 | Ruland | |
| 8,997,932 | B1 | 4/2015 | Ochoa | |
| 9,175,724 | B2 | 11/2015 | Johnson | |
| 9,359,819 | B1 | 6/2016 | Valadez | |
| D766,461 | S | 9/2016 | Moss | |
| D766,462 | S | 9/2016 | Moss | |
| 9,435,155 | B2 | 9/2016 | Tiber | |
| D777,350 | S | 1/2017 | Moss | |
| 9,534,443 | B1 | 1/2017 | Bogart | |
| 9,714,542 | B1 | 7/2017 | Harcz | |
| 10,030,448 | B2 | 7/2018 | Miller | |
| 10,087,682 | B2 | 10/2018 | Pfeifer | |
| 10,138,680 | B2 | 11/2018 | Williams | |
| D835,807 | S | 12/2018 | Lentine | |
| 10,294,721 | B1 | 5/2019 | Jafarmadar | |
| 10,435,947 | B2 | 10/2019 | Parker | |
| 10,458,183 | B2 * | 10/2019 | Tiber | B26D 7/01 |
| 10,487,576 | B2 * | 11/2019 | Ballard | E06C 1/22 |
| 10,507,572 | B2 | 12/2019 | Williams | |
| 10,550,639 | B2 | 2/2020 | Tamez Reyes | |
| 10,590,703 | B2 | 3/2020 | Parker | |
| 10,597,941 | B2 * | 3/2020 | Moss | E06C 1/16 |
| 10,612,305 | B2 | 4/2020 | Mora | |
| 10,662,706 | B2 | 5/2020 | Heffernan | |
| D887,581 | S | 6/2020 | Dangrow | |
| D899,628 | S | 10/2020 | Moncada | |
| 10,801,263 | B2 | 10/2020 | Dangrow | |
| D905,869 | S | 12/2020 | Lentine | |
| D935,053 | S | 11/2021 | Lentine | |
| 11,187,039 | B2 * | 11/2021 | Moreno Moncada | E06C 7/46 |
| 11,441,356 | B2 * | 9/2022 | Maxfield | E06C 1/32 |

(56) References Cited

U.S. PATENT DOCUMENTS

| | | | | |
|---|---|---|---|---|
| 12,184,716 | B2 | 12/2024 | Holden | |
| D1,065,599 | S | 3/2025 | Van Wambeke | |
| D1,065,600 | S | 3/2025 | Van Wambeke | |
| 2002/0017430 | A1 | 2/2002 | Rosko | |
| 2002/0070137 | A1 | 6/2002 | Hedges | |
| 2002/0104709 | A1 | 8/2002 | Hines | |
| 2002/0108811 | A1 | 8/2002 | Ulmschneider | |
| 2003/0089630 | A1 | 5/2003 | Cooper | |
| 2003/0213646 | A1 | 11/2003 | Gallion | |
| 2003/0230452 | A1 | 12/2003 | Campagna | |
| 2004/0065989 | A1 | 4/2004 | Campbell | |
| 2004/0149607 | A1 | 8/2004 | Gorman | |
| 2004/0238278 | A1 | 12/2004 | Gibson | |
| 2005/0150724 | A1 | 7/2005 | Snider | |
| 2005/0258002 | A1 | 11/2005 | Sabo | |
| 2005/0280228 | A1 | 12/2005 | Fernandes | |
| 2005/0284701 | A1 | 12/2005 | Gibson | |
| 2006/0070806 | A1 | 4/2006 | Simpson | |
| 2006/0214384 | A1 | 9/2006 | Gwin | |
| 2006/0219586 | A1 | 10/2006 | Phillips | |
| 2007/0084669 | A1 | 4/2007 | Campagna | |
| 2007/0181367 | A1 | 8/2007 | Astor | |
| 2007/0193828 | A1 | 8/2007 | Astor | |
| 2007/0193829 | A1 | 8/2007 | Astor | |
| 2008/0083583 | A1 | 4/2008 | Gibson | |
| 2008/0142300 | A1 | 6/2008 | Roberge | |
| 2009/0028336 | A1 | 1/2009 | Goodman | |
| 2009/0078504 | A1 | 3/2009 | Astor | |
| 2009/0229918 | A1 | 9/2009 | Moss | |
| 2009/0250365 | A1 | 10/2009 | Goto | |
| 2009/0283361 | A1 | 11/2009 | Gibson | |
| 2010/0011679 | A1 | 1/2010 | Monaco | |
| 2010/0200331 | A1 | 8/2010 | Hager | |
| 2011/0100752 | A1 | 5/2011 | Donlon | |
| 2012/0024630 | A1 | 2/2012 | Vanlaningham | |
| 2012/0097481 | A1 | 4/2012 | Schienke | |
| 2012/0217093 | A1 | 8/2012 | Latimer | |
| 2012/0298448 | A1* | 11/2012 | Houdyshell | E06C 1/18 182/106 |
| 2013/0112502 | A1 | 5/2013 | Oliver | |
| 2013/0128560 | A1 | 5/2013 | Werner | |
| 2013/0327593 | A1 | 12/2013 | Perkins | |
| 2013/0327907 | A1 | 12/2013 | Reitz | |
| 2014/0332316 | A1* | 11/2014 | Tiber | E06C 7/46 83/13 |
| 2014/0353191 | A1 | 12/2014 | Decicco | |
| 2016/0192989 | A1 | 7/2016 | Aman | |
| 2017/0254146 | A1 | 9/2017 | Burchnell | |
| 2017/0259424 | A1 | 9/2017 | Vetter | |
| 2018/0163471 | A1 | 6/2018 | Lentine | |
| 2018/0258698 | A1 | 9/2018 | Minock | |
| 2018/0291685 | A1 | 10/2018 | Moreno | |
| 2018/0345478 | A1 | 12/2018 | Grela | |
| 2019/0226279 | A1* | 7/2019 | Beggs | E06C 7/46 |
| 2019/0376342 | A1* | 12/2019 | Maxfield | E06C 7/46 |
| 2022/0145702 | A1* | 5/2022 | Gericke | E06C 7/14 |
| 2022/0178153 | A1* | 6/2022 | Woodward | E06C 7/00 |
| 2024/0352792 | A1* | 10/2024 | Ramirez | E06C 7/16 |
| 2025/0154828 | A1 | 5/2025 | Parker | |
| 2025/0198237 | A1 | 6/2025 | Mcrorie, III | |

FOREIGN PATENT DOCUMENTS

| | | | |
|---|---|---|---|
| GB | 2207453 | A | 2/1989 |
| GB | 2297350 | A | 7/1996 |

OTHER PUBLICATIONS

Little Giant Ladder Systems, “Little Giant Work Platform,” Advertising Brochure, (May 23, 2005).

Werner Co., “Werner #1 in Ladders, Climbing Equipment,” Werner Catalog 2015, p. 41, 42, back page.

Little Giant Work—Platform webpage from CampingWorld.com believed to be accessed in 2023 showing a product believed to be publicly available in May of 2005.

* cited by examiner

LADDER, LADDER TOP AND METHODS

CROSS-REFERENCE TO RELATED APPLICATIONS

This is a nonprovisional of U.S. provisional patent application Ser. No. 63/284,599 filed Nov. 30, 2021, incorporated by reference herein.

FIELD OF THE INVENTION

The present invention is related to ladder tops of ladders which have features to which tools or objects may be attached. (As used herein, references to the "present invention" or "invention" relate to exemplary embodiments and not necessarily to every embodiment encompassed by the appended claims.) More specifically, the present invention is related to ladder tops of ladders which have metal plates to which tools or objects that have magnets may be attached and/or have passages to which hooks or carabiners may be attached.

BACKGROUND OF THE INVENTION

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

Whenever a ladder is used, it is very often that tools or objects are required to assist the user in whatever work the user is performing. To have these tools or objects readily and safely available to the user so the user doesn't have to climb up and down the ladder when they are needed, or risk putting himself or herself in a precarious position to reach them is an important requirement. To accommodate this, ladder tops have slots or bins or openings or magnets to assist users in making these tools or objects assessable when the user has climbed onto the ladder. However, there are some tools or objects that have magnets to hold them in place or have lanyards or ropes that are used to hold them in place so that if they are dropped, they will not fall to the ground.

BRIEF SUMMARY OF THE INVENTION

The present invention pertains to a ladder top. The ladder top comprises a surface. The ladder top comprises a front side flange extending down from the surface. The ladder top comprises a rear side flange extending down from the surface. The ladder top comprises a right side flange extending down from the surface having a right metal plate through which right fasteners extend into a right front rail and a right rear rail to attach the right front rail and the right rear rail to the right side flange. The ladder top comprises a left side flange extending down from the surface having a left metal plate through which left fasteners extend into a left front rail and a left rear rail to attach the left front rail and the left rear rail to the left side flange.

The present invention pertains to a ladder. The ladder comprises a front assembly having a right front rail and a left front rail in parallel in spaced relation with the right front rail, front rungs attached to the right front rail and the left front rail and disposed between the right front rail and the left front rail. The ladder comprises a rear assembly having a right rear rail and a left rear rail in parallel and space relation with the right rear rail, rear rungs attached to the right rear rail and the left rear rail and disposed between the right rear rail and the left rear rail. The ladder comprises a ladder top having a right side flange having a right metal plate through which right fasteners extend into the right front rail and the right rear rail to attach the right front rail and the right rear rail to the right side flange; a left side flange having a left metal plate through which left fasteners extend into the left front rail and the left rear rail to attach the left front rail and the left rear rail to the left side flange.

The present invention pertains to a ladder top. The ladder top comprises a surface. The ladder top comprises a front side flange extending down from the surface. The ladder top comprises a rear side flange extending down from the surface. The ladder top comprises a right side flange extending down from the surface having right fasteners which extend into a right front rail and a right rear rail to attach the right front rail and the right rear rail to the right side flange. The ladder top comprises a left side flange extending down from the surface having left fasteners which extend into a left front rail and a left rear rail to attach the left front rail and the left rear rail to the left side flange. The ladder top comprises passages at which hooks or carabiners attach to the ladder top.

The present invention pertains to a method of using a ladder. The method comprises the steps of climbing a ladder. There is the step of attaching a tool having a magnet to a right metal plate on a right side flange of a ladder top of the ladder.

The present invention pertains to a method of using a ladder. The method comprises the steps of climbing a ladder. There is the step of attaching a carabiner to a passage on a ladder top of the ladder.

The present invention pertains to a method for producing a ladder. The method comprises the steps of placing a right metal plate into a recess in a right side flange of a ladder top of the ladder. There is the step of attaching the right metal plate to the right side flange with right fasteners which extend through the right metal plate, the right side flange, a right front rail and a right rear rail.

DETAILED DESCRIPTION OF THE INVENTION

Figure 1A:
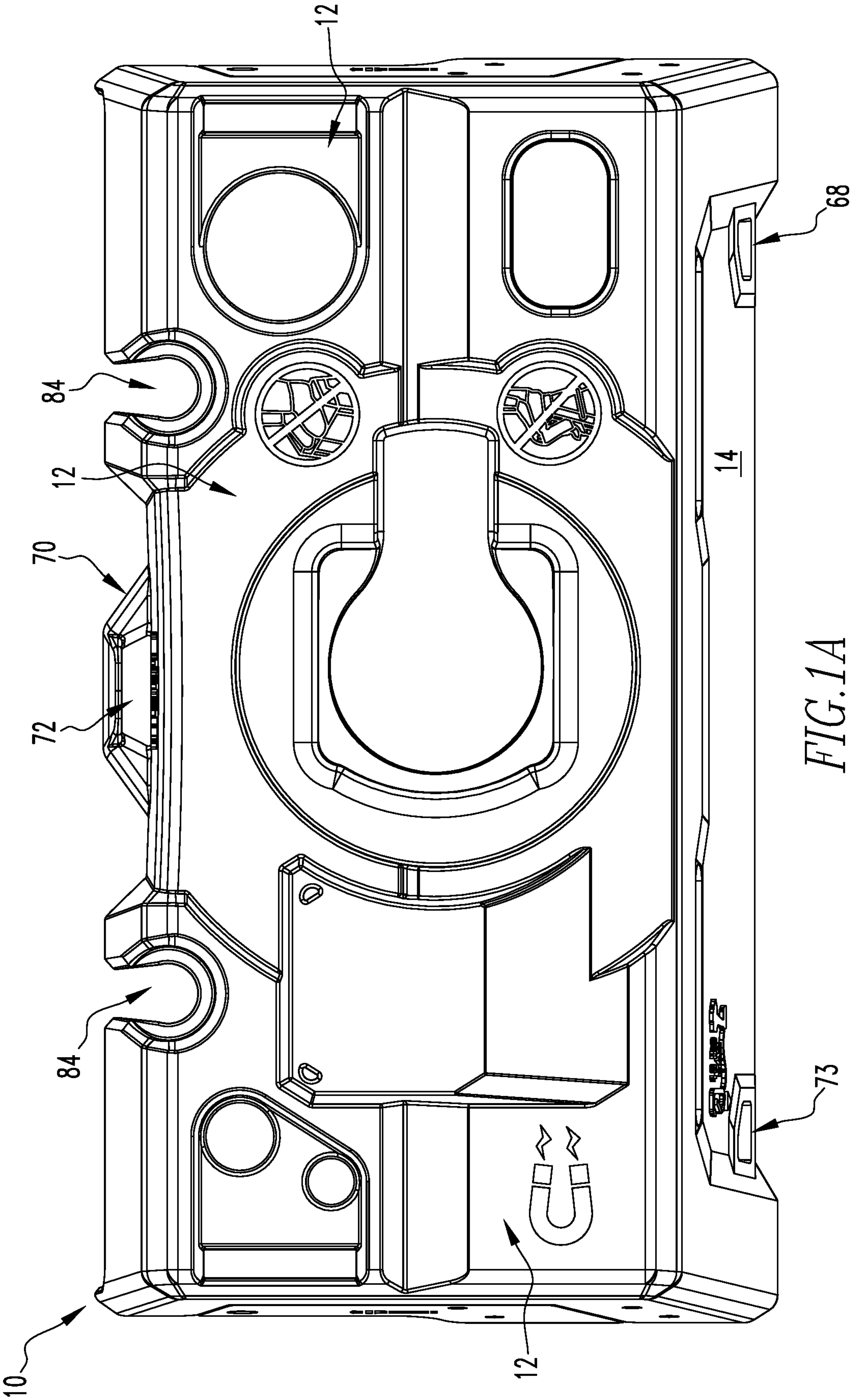
FIG. 1A shows an overhead view of the ladder top.
Figure 1C:
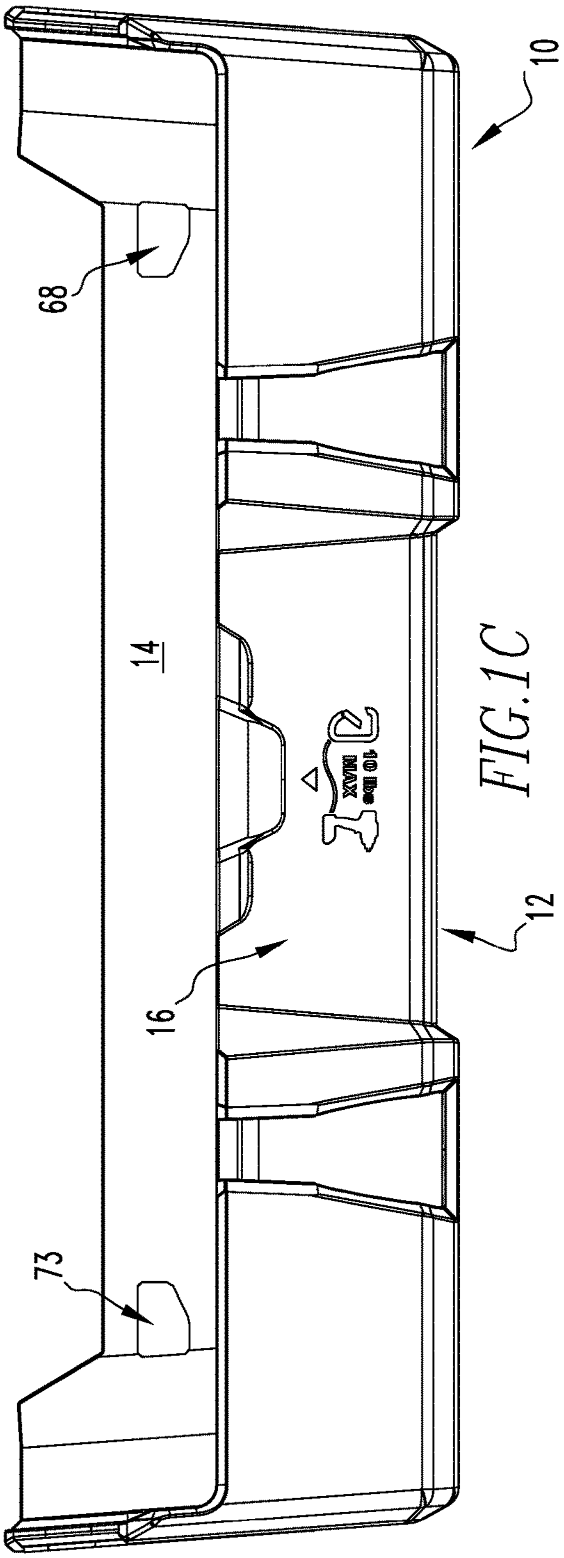
FIG. 1C shows a rear view of the ladder top.
Figure 1B:
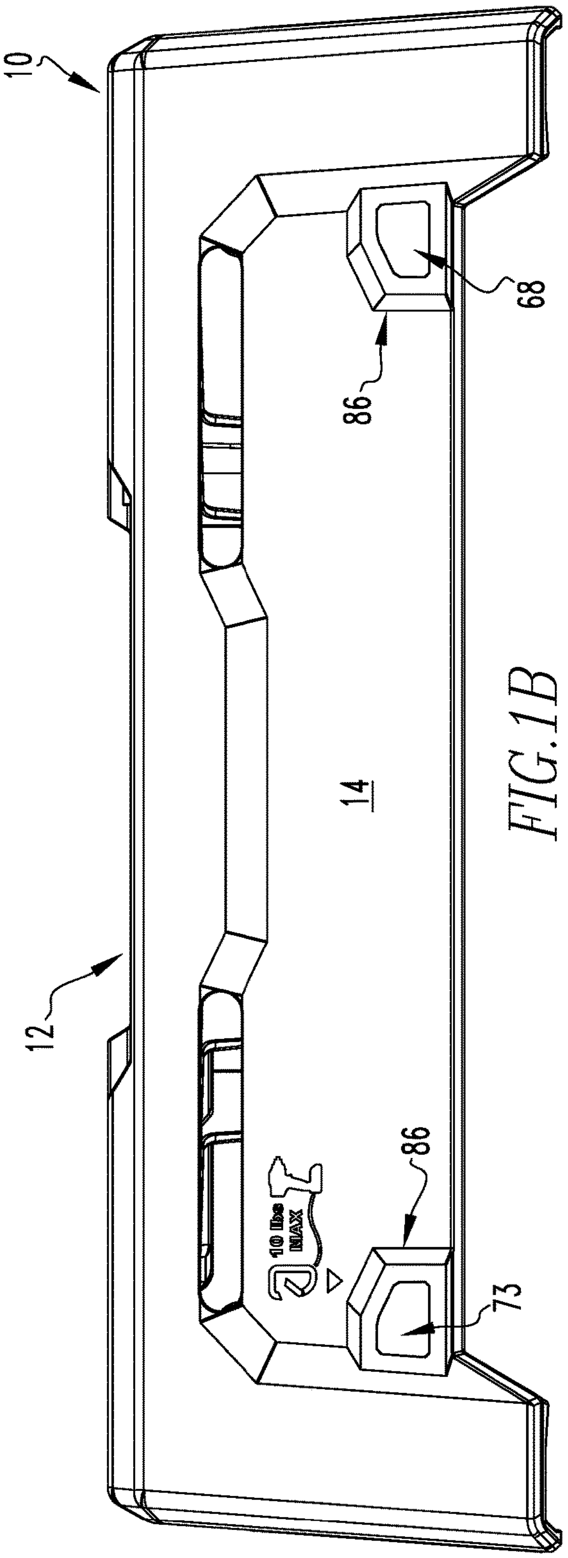
FIG. 1B shows a front view of the ladder top.
Figure 1D:
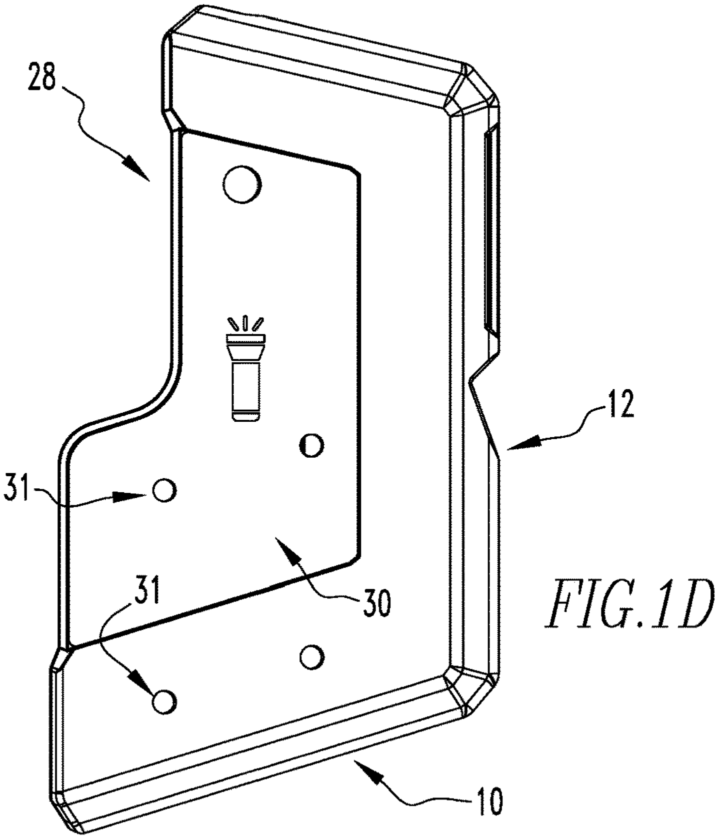
FIG. 1D shows a left side view of the ladder top.
Figure 1E:
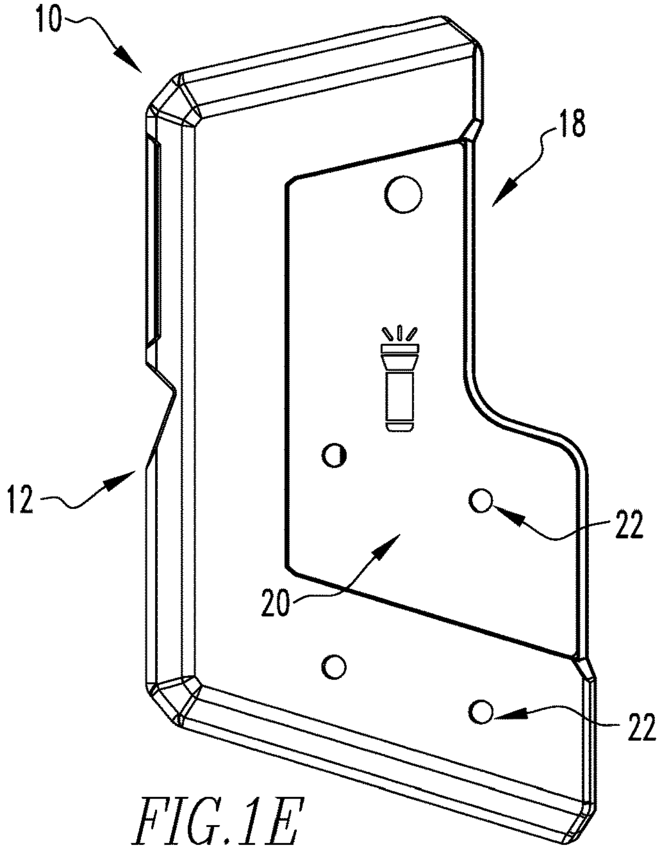
FIG. 1E shows a right side view of the ladder top.

Referring now to the drawings wherein like reference numerals refer to similar or identical parts throughout the several views, and more specifically to FIGS. 1A-4 thereof, there is shown a ladder top 10. The ladder top 10 comprises a surface 12. The ladder top 10 comprises a front side flange 14 extending down from the surface 12. The ladder top 10 comprises a rear side flange 16 extending down from the surface 12. The ladder top 10 comprises a right side flange 18 extending down from the surface 12 having a right metal plate 20 through which right fasteners 22 extend into a right front rail 24 and a right rear rail 26 to attach the right front rail 24 and the right rear rail 26 to the right side flange 18. The ladder top 10 comprises a left side flange 28 extending down from the surface 12 having a left metal plate 30 through which left fasteners 32 extend into a left front rail 34 and a left rear rail 36 to attach the left front rail 34 and the left rear rail 36 to the left side flange 28. The right and left metal plates 20, 30 may each be between 1⁄16 of an inch and 3⁄8 of an inch thick.

Figure 3:
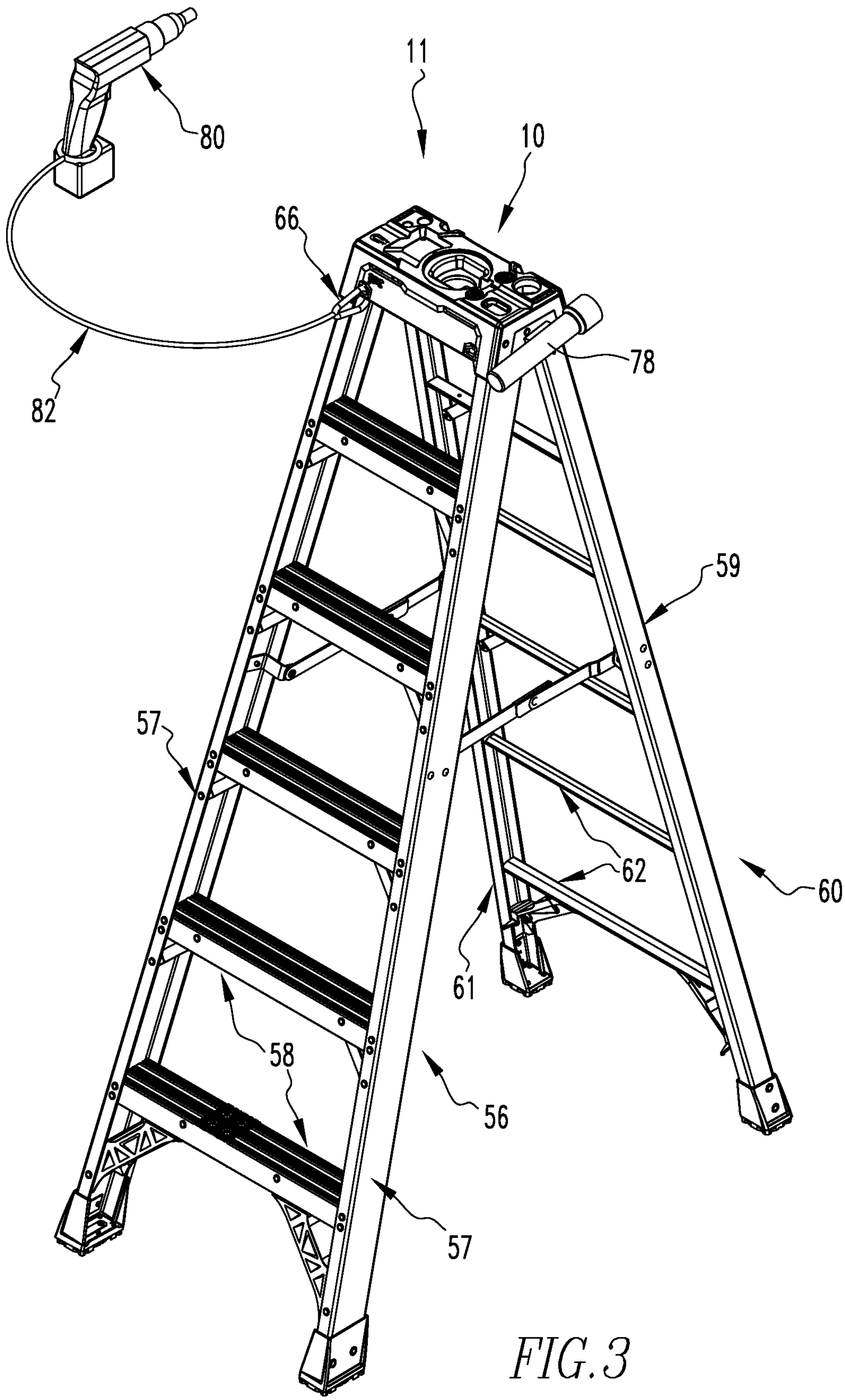
FIG. 3 shows the ladder top in place on a step ladder.

The right metal plate 20 may conform to the shape of the right side flange 18 and the left metal plate 30 may conform to the shape of the left side flange 28. The right side flange 18 may have an L shape and the left side flange 28 may have an L shape. The right metal plate 20 may have an L shape which fits with the L shape of the right side flange 18 and the left metal plate 30 may have an L shape which fits with the L shape of the left side flange 28. The right side flange 18 may have a long portion 74 and a short portion 76 which extends down from the long portion 74 to form the L shape. The right metal plate 20 may have a long portion 74 and a short portion 76 which extends down from the long portion 74 of the right metal plate 20 to form the L shape. The long portion 74 of the right metal plate 20 fits onto the long portion 74 of the right side flange 18 and the short portion 76 of the right metal plate 20 fits onto the short portion 76 of the right side flange 18. The left metal plate 30 may have a long portion 74 and a short portion 76 which extends down from the long portion 74 of the left metal plate 30 to form the L shape. The long portion 74 of the left metal plate 30 fits onto the long portion 74 of the left side flange 28 and the short portion 76 of the left metal plate 30 fits onto the short portion 76 of the left side flange 28. As shown in FIG. 3, the right front rail 24 attaches with right fasteners 22 or rivets to the inside of the long portion 74 and the short portion 76 of the right side flange 18 with at least one of the right fasteners 22 or rivets extending through the right metal plate 20 and the right side flange 18 and the right front rail 24. The right rear rail 26 rotatably attaches with a right fastener or rivet to only the inside of the long portion 74 of the right side flange 18 with the right fastener or rivet extending through the right metal plate 20 and the right side flange 18 and the right rear rail 26. The left front rail 34 attaches with left fasteners 32 or rivets to the inside of the long portion 74 and the short portion 76 of the left side flange 28 with at least one of the left fasteners 32 or rivets extending through the left metal plate 30 and the left side flange 28 and the left front rail 34. The left rear rail 36 rotatably attaches with a left fastener or a rivet to only the inside of the long portion 74 of the left side flange 28 with the left fastener or rivet extending through the left metal plate 30 and the left side flange 28 and the left rear rail 36. The long portion 74 of the right and left metal plates 20, 30 may each be at least 2 inches long.

Figure 5:
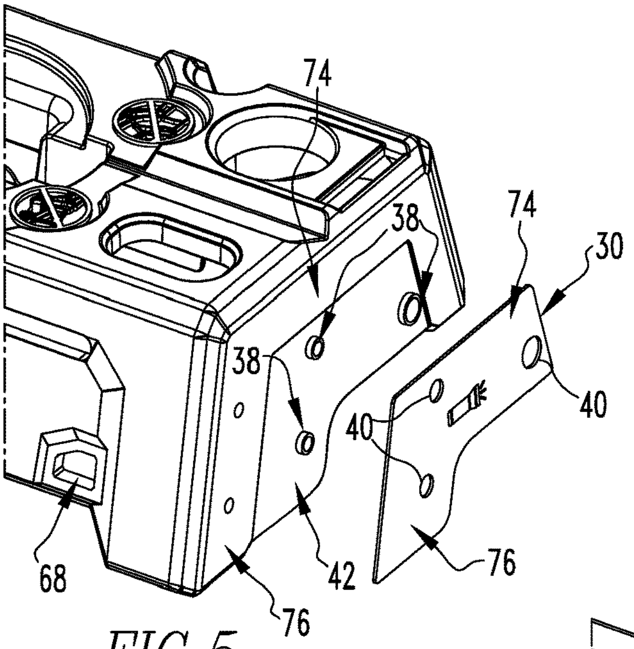
FIG. 5 shows the right metal plate positioned alongside the bosses in the recess of the right side flange.
Figure 6:
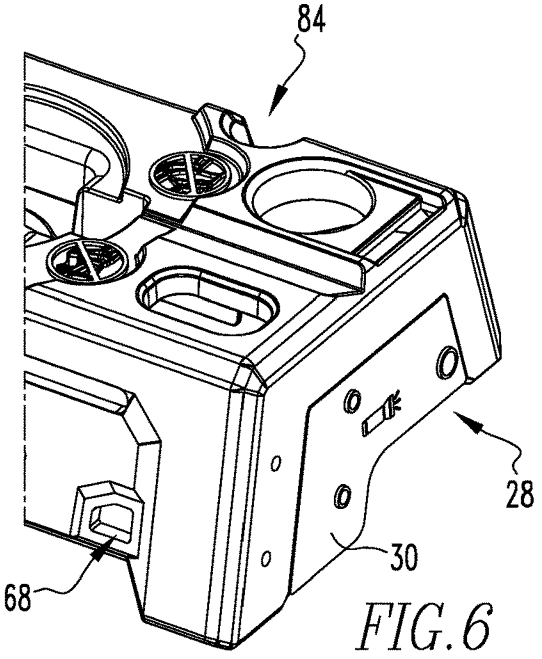
FIG. 6 shows the right metal plate positioned in the recess with the bosses extending through the holes in the right metal plate.
Figure 7:
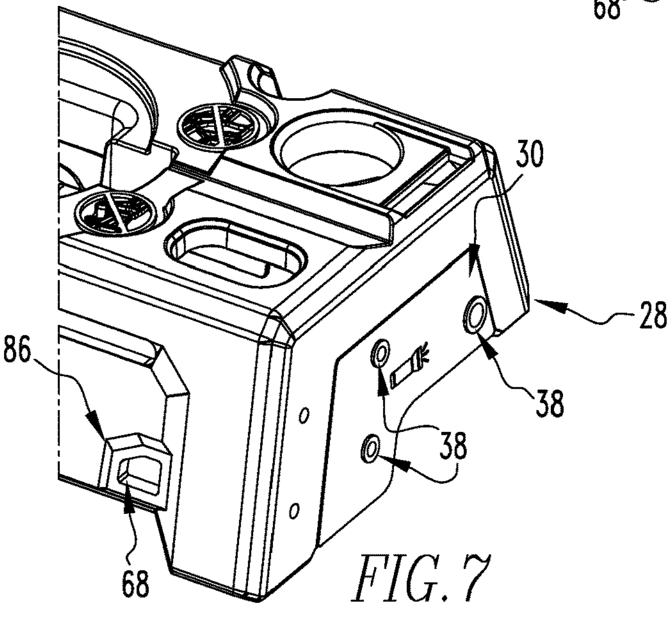
FIG. 7 shows the bosses flared over the right metal plate after heat is applied to them to cause them to melt over the right metal plate to hold the right metal plate to the right side flange.

Referring to FIGS. 5-7, the right side flange 18 may have bosses 38 and the right metal plate 20 may have holes 40 through which the bosses 38 extend to hold the right metal plate 20 to the right side flange 18. The right fasteners 22 extend through the holes 40 of the right metal plate 20 and the bosses 38. The right side flange 18 may have a recess 42 in which the right metal plate 20 is disposed. The bosses 38 are disposed in the recess 42.

The surface 12 may have a perimeter 44 and a front edge 46, a rear edge 48, a right edge 50 extending between the front edge 46 and the rear edge 48, and a left edge 52 extending between the front edge 46 and the rear edge 48, as shown in FIGS. 1A-2D. The front side flange 14 extending down from the front edge 46, the rear side flange 16 extending down from the rear edge 48, the right side flange 18 extending down from the right edge 50 and the left side flange 28 extending down from the left edge 52. The surface 12 and the front side flange 14 and the rear side flange 16 and the right side flange 18 and the left side flange 28 may be a single continuous piece of plastic. The ladder top 10 may include passages 68, 72, 73 through which hooks 64 or carabiners 66 attach to the ladder top 10. The ladder top 10 may have one or more lasso slots 84 in the perimeter 44 and pockets and openings in the surface 12 to hold screw drivers, pliers, wrenches, brushes, cans, pipes, tubes, drills, screws, nuts, bolts and/or pins.

The present invention pertains to a ladder 11, as shown in FIGS. 1A-3. The ladder 11 comprises a front assembly 56 having a right front rail 24 and a left front rail 34 in parallel in spaced relation with the right front rail 24, front rungs 58 attached to the right front rail 24 and the left front rail 34 and disposed between the right front rail 24 and the left front rail 34. The ladder 11 comprises a rear assembly 60 having a right rear rail 26 and a left rear rail 36 in parallel and space relation with the right rear rail 26, rear rungs 62 attached to the right rear rail 26 and the left rear rail 36 and disposed between the right rear rail 26 and the left rear rail 36. The ladder 11 comprises a ladder top 10 having a right side flange 18 having a right metal plate 20 through which right fasteners 22 extend directly into the right front rail 24 and directly into the right rear rail 26 to permanently attach the right front rail 24 and the right rear rail 26 to the right side flange 18. The ladder top 10 having a left side flange 28 having a left metal plate 30 through which left fasteners 32 extend directly into the left front rail 34 and the left rear rail 36 to permanently attach the left front rail 34 and the left rear rail 36 to the left side flange 28.

The present invention pertains to a ladder top 10. The ladder top 10 comprises a surface 12. The ladder top 10 comprises a front side flange 14 extending down from the surface 12. The ladder top 10 comprises a rear side flange 16 extending down from the surface 12. The ladder top 10 comprises a right side flange 18 extending down from the surface 12 having right fasteners 22 which extend into a right front rail 24 and a right rear rail 26 to attach the right front rail 24 and the right rear rail 26 to the right side flange 18. The ladder top 10 comprises a left side flange 28 extending down from the surface 12 having left fasteners 32 which extend into a left front rail 34 and a left rear rail 36 to attach the left front rail 34 and the left rear rail 36 to the left side flange 28. The ladder top 10 comprises passages 68, 73 at which carabiners 66 attach to the ladder top 10, as shown in FIGS. 1B, 2A, 2B and 3. The passages 68, 73 have a closed circumference and may have a reinforcing wall 86 about the circumference which extends from the respective flange they are in. There may be a first passage 68 with a reinforcing wall 86 about its circumference at the front side flange 14 and a third passage 73 with a reinforcing wall 86 about its circumference also at the front side flange 14 located adjacent the bottom of the front side flange 14. The reinforcing wall 86 is part of the one-piece ladder top 10.

Figure 2A:
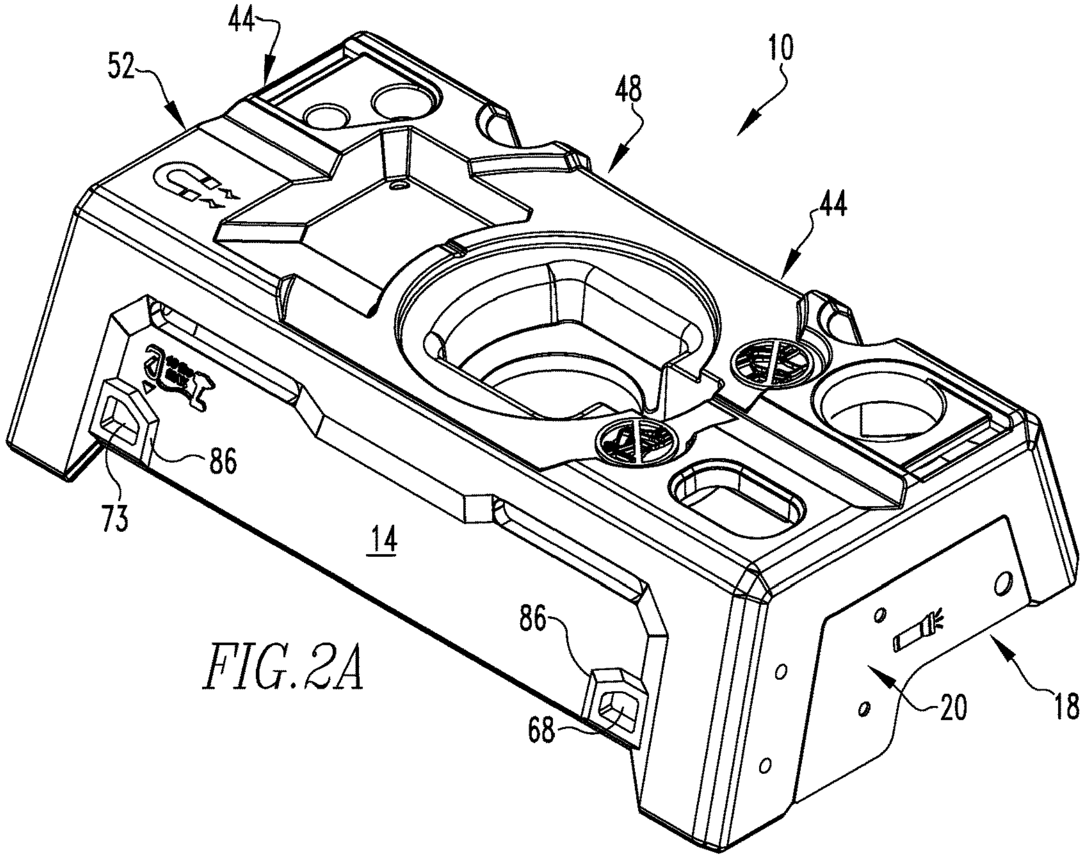
FIG. 2A shows a front right view of the ladder top with the metal plates and carabiner passages indicated.
Figure 2B:
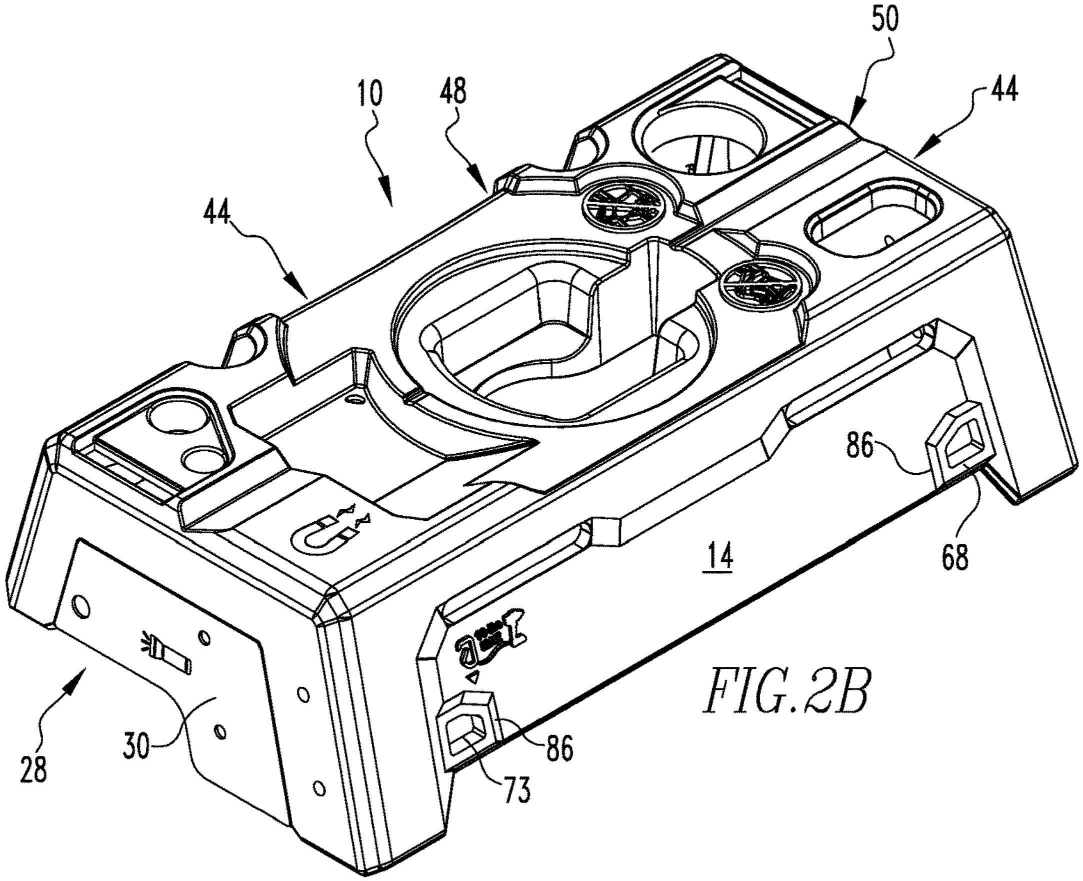
FIG. 2B shows a front left perspective view of the ladder top with the metal plates and carabiner passages indicated.
Figure 2C:
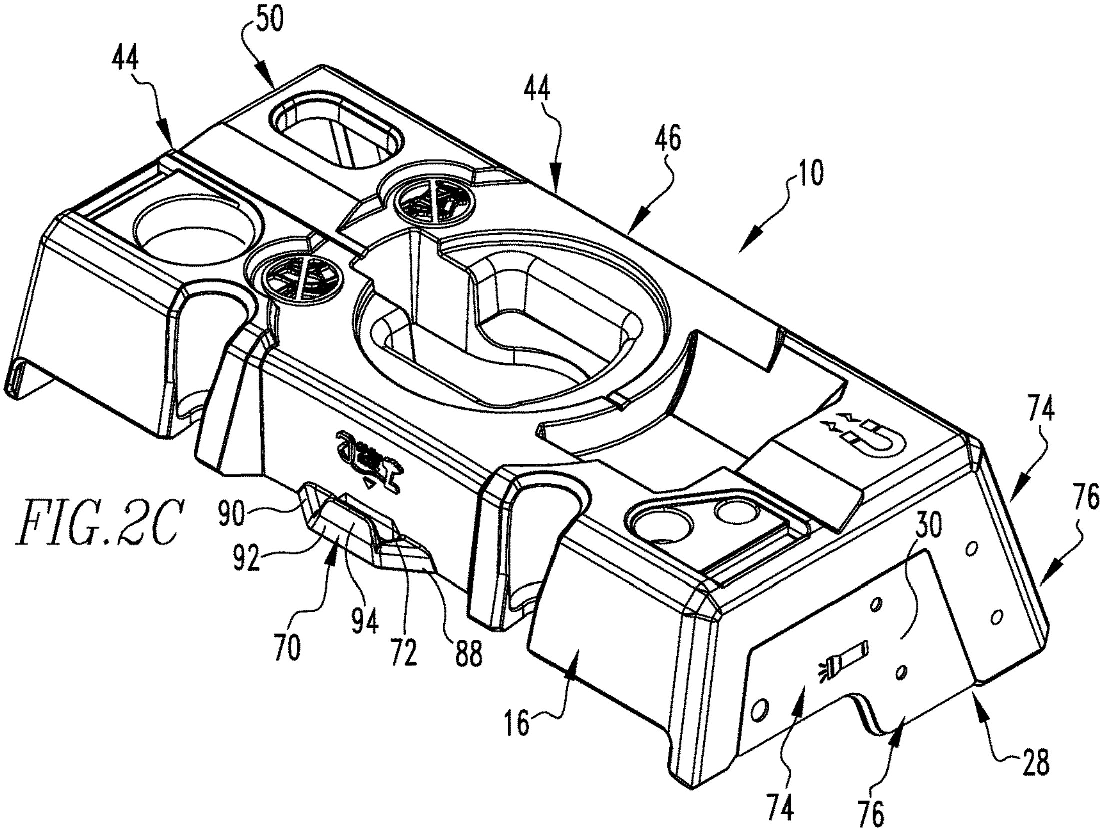
FIG. 2C shows rear front perspective views of the ladder top with the metal plates and carabiner passages indicated.
Figure 2D:
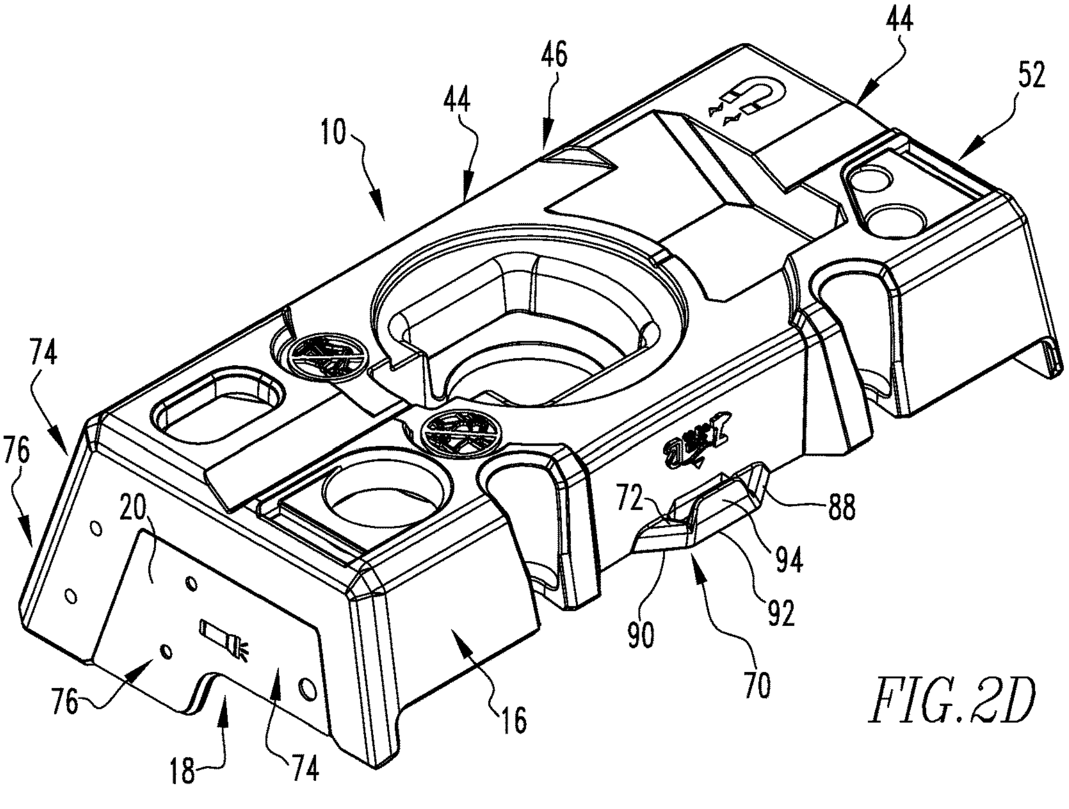
FIG. 2D shows rear left perspective views of the ladder top with the metal plates and carabiner passages indicated.

The ladder top 10 may include a paint bucket hook 70 at the back side flange, and there is a second passage 72 at the paint bucket hook 70. The paint bucket hook 70 is formed by a first strut 88 extending out from the rear side flange 16 and a second strut 90 extending out from the rear side flange 16 adjacent the first strut 88, as shown in FIGS. 2C and 2D. There is a bar 92 to which the first strut 88 and second strut 90 are attached. The bar 92 is in parallel with the rear side flange 16 and offset outwards from the rear side flange 16 by the first and second struts 88, 90. The bar 92 and the first and second struts 88, 90 form and define the second passage 72 between them. The bar 92 has a lip 94 which extends upwards from the bar 92. The bar 92 with the lip 94 and the first and second struts 88, 90 form the paint bucket hook 70. The handle of a paint bucket hangs on the paint bucket hook 70 with the lip 94 catching the handle and preventing the handle from sliding off the paint bucket hook 70. The first and second struts 88, 90 and the bar 92 and the lip 94 are all part of the one-piece ladder top 10.

The right side flange 18 may have a right metal plate 20 through which the right fasteners 22 extend into the right front rail 24 and the right rear rail 26 to attach the right front rail 24 and the right rear rail 26 to the right side flange 18; and the left side flange 28 may have a left metal plate 30 through which the left fasteners 32 extend into the left front rail 34 and the left rear rail 36 to attach the left front rail 34 and the left rear rail 36 to the left side flange 28.

The present invention pertains to a ladder 11, as shown in FIGS. 1A-3. The ladder 11 comprises a front assembly 56 having a right front rail 24 and a left front rail 34 in parallel and spaced relation with the right front rail 24, front rungs 58 attached to the right front rail 24 and the left front rail 34 and disposed between the right front rail 24 and the left front rail 34. The ladder 11 comprises a rear assembly 60 having a right rear rail 26 and a left rear rail 36 in parallel and space relation with the right rear rail 26, rear rungs 62 attached to the right rear rail 26 and the left rear rail 36 and disposed between the right rear rail 26 and the left rear rail 36. The ladder 11 comprises a ladder top 10 having a right side flange 18 through which right fasteners 22 extend into the right front rail 24 and the right rear rail 26 to permanently attach the right front rail 24 and the right rear rail 26 to the right side flange 18; a left side flange 28 through which left fasteners 32 extend into the left front rail 34 and the left rear rail 36 to permanently attach the left front rail 34 and the left rear rail 36 to the left side flange 28. The ladder 11 comprises passages 68, 72, 73 at which carabiners 66 attach to the ladder top 10.

The present invention pertains to a method of using a ladder 11. The method comprises the steps of climbing a ladder 11. There is the step of attaching a tool 80 having a magnet to a right metal plate 20 on a right side flange 18 of a ladder top 10 of the ladder 11.

The present invention pertains to a method of using a ladder 11. The method comprises the steps of climbing a ladder 11. There is the step of attaching a carabiner to a passage on a ladder top 10 of the ladder 11.

The present invention pertains to a method for producing a ladder 11. The method comprises the steps of placing a right metal plate 20 into a recess 42 in a right side flange 18 of a ladder top 10 of the ladder 11. There is the step of attaching the right metal plate 20 to the right side flange 18 with right fasteners 22 which extend through the right metal plate 20, the right side flange 18, a right front rail 24 and a right rear rail 26.

This invention is a molded plastic ladder top 10 which has metal plates attached to the sides which serve to strengthen the top to rail connection and provide a foundation for the magnetic attachment of tools such as flashlights, etc. Tools, lights, etc. with magnetic bases can be conveniently attached to the metal plates on the ladder top 10. The metal plates also strengthen the ladder 11 in the rail to top connections.

In addition, the top has passages 68, 72, 73 in the front face and in the paint bucket hook 70 which serve as attachment points for hooks 64 or carabiners 66 such as those used for safety lanyards 82 on tools such as electric drills. Holes 40 for the attachment of tool 80 lanyards provide for greater safety when working on the ladder 11.

FIGS. 1A-1E show multiple projection views of the ladder top 10. The top is molded of plastic. Metal plates are located in recesses 42 at both sides of the top. Passages 68, 72, 73 for carabiner attachment are located in the front face and in the conventional bucket hook on the rear face.

FIGS. 2A-2D show front and rear perspective views of the ladder top 10 with the metal plates and carabiner passages 54 indicated.

FIG. 3 shows the ladder top 10 in place on a step ladder 11. An electric drill is shown attached to the ladder top 10 with a tool lanyard and carabiner. A flashlight 78 is shown magnetically attached to a metal plate.

Figure 4:
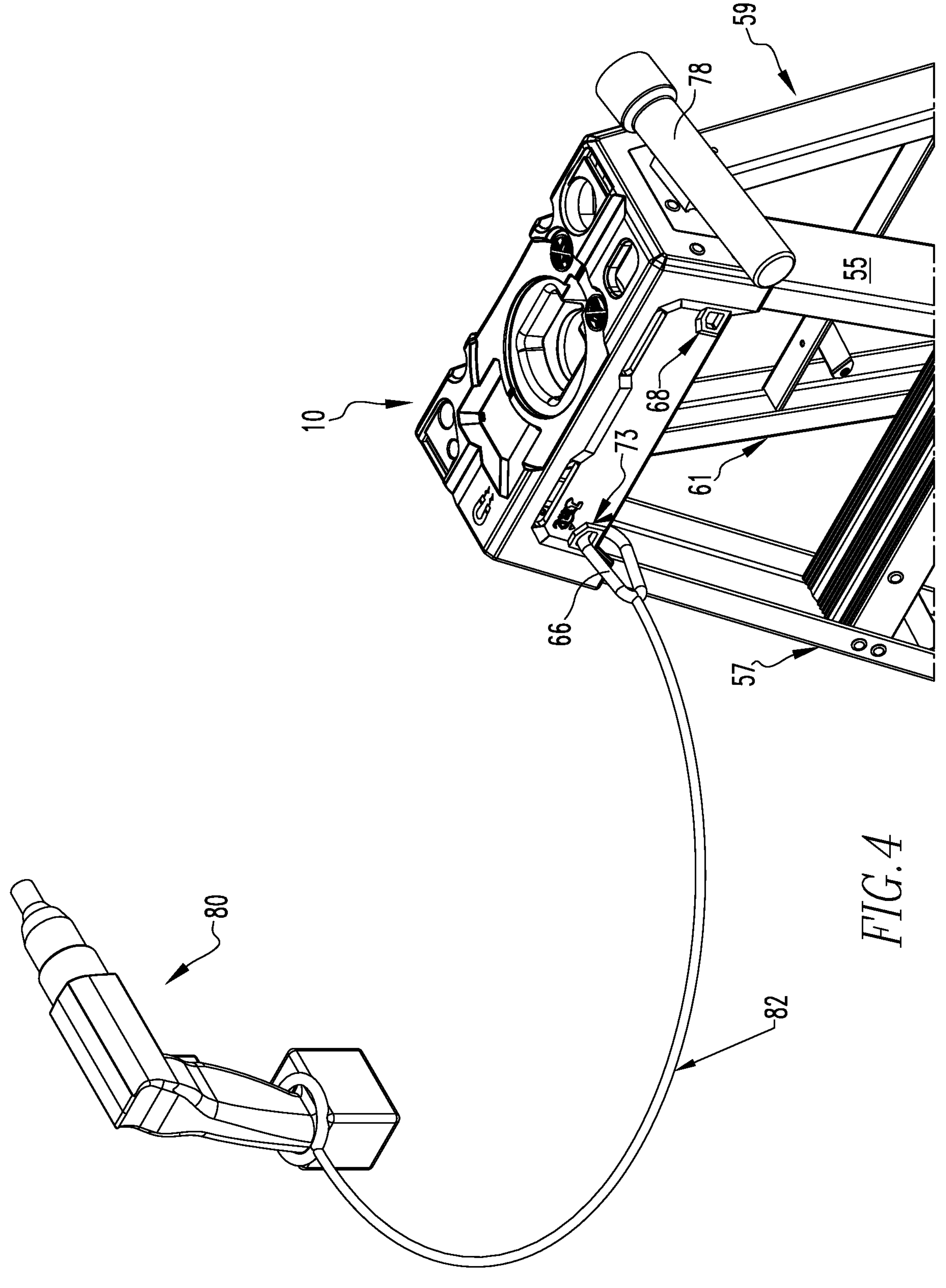
FIG. 4 is a closeup view of FIG. 3.

FIG. 4 is a closeup view of FIG. 3. The carabiner is shown attached to one of the carabiner holes 40. The magnetic base of the flashlight 78 can be seen stuck to the metal plate.

FIG. 5 shows the right metal plate 20 positioned alongside the bosses 38 in the recess 42 of the right side flange 18. FIG. 6 shows the right metal plate 20 positioned in the recess 42 with the bosses 38 extending through the holes 40 in the right metal plate 20. FIG. 7 shows the bosses 38 flared over the right metal plate 20 after heat is applied to them to cause them to melt over the right metal plate 20 to hold the right metal plate 20 to the right side flange 18. With the right metal plate 20 held in position to the right side flange 18, fasteners such as rivets or bolts are then extended through the holes 40 and into the right front and rear rails to attach the right front and rear rails to the right side flange 18 without having to hold the right metal plate 20 to the right side flange 18. Alternatively, if it is so desired, bosses 38 do not need to be used and the right metal plate 20 is held in the recess 42 so the holes 40 of the right metal plate 20 aligned with the holes 40 in the right side flange 18 so fasteners can be inserted through these holes 40 to attach the right and rear front rails to the right side flange 18 and right metal plate 20.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. A ladder top comprising:

a ladder top body for mounting to upper end portions of one or more ladder rails, the ladder top body including:
- an upper surface;
- a front side flange extending down from the upper surface;
- a rear side flange extending down from the upper surface;
- a right side flange extending down from the upper surface; and
- a left side flange extending down from the upper surface;

a right metal plate having attachment openings for securing the right metal plate to the right side flange of the ladder top body; and a left metal plate having attachment openings for securing the left metal plate to the left side flange of the ladder top body.

2. The ladder top of claim 1 wherein the upper surface has a perimeter and a front edge, a rear edge, a right edge extending between the front edge and the rear edge, and a left edge extending between the front edge and the rear edge, the front side flange extending down from the front edge, the rear side flange extending down from the rear edge, the right side flange extending down from the right edge and the left side flange extending down from the left edge.

3. The ladder top of claim 1 wherein the ladder top body includes an attachment opening for removably attaching an item to the ladder top.

4. The ladder top of claim 3 wherein the attachment opening has a circumference with a reinforcing wall disposed on and about the circumference, the circumference of the attachment opening being closed.

5. The ladder top of claim 4 wherein the attachment opening with the reinforcing wall is disposed in the front side flange.

6. The ladder top of claim 5 wherein the ladder top body is formed of a single piece of plastic.

7. The ladder top of claim 1 wherein the ladder top body includes a paint tray hook, wherein the paint tray hook includes a second passage.

8. The ladder top of claim 1 wherein the right side flange includes a right recess receiving the right metal plate, wherein the left side flange includes a left recess receiving the left metal plate.

9. The ladder top of claim 1 wherein the right side flange includes deformable bosses extending through the attachment openings of the right side plate to secure the right side plate to the right side flange; and wherein the left side flange includes deformable bosses extending through the attachment openings of the left side plate to secure the left side plate to the left side flange.

10. A ladder top comprising:

a surface;

a front side flange extending down from the surface;

a rear side flange extending down from the surface;

a right side flange extending down from the surface and having a right metal plate secured to the right side flange via right fasteners; and a left side flange extending down from the surface and having a left metal plate secured to the left side flange via left fasteners, wherein the right side flange has bosses and the right metal plate has holes the bosses extend through to hold the right metal plate to the right side flange, the right fasteners extend through the holes of the right metal plate and the bosses.

11. The ladder top of claim 10 wherein the right side flange has a recess in which the right metal plate is disposed, the bosses disposed in the recess.

12. A ladder comprising:

a front assembly having a right front rail and a left front rail in parallel and spaced relation with the right front rail, front rungs attached to the right front rail and the left front rail and disposed between the right front rail and the left front rail;

a rear assembly having a right rear rail and a left rear rail in parallel and space relation with the right rear rail, rear rungs attached to the right rear rail and the left rear rail and disposed between the right rear rail and the left rear rail; and a ladder top mounted to upper end portions of the front assembly and the rear assembly, the ladder top having:

a right side flange;

a left side flange;

a right metal plate having one or more right attachment openings, the right metal plate being secured to the right side flange with the one or more right attachment openings; and a left metal plate having one or more left attachment openings, the left metal plate being secured to the left side flange with the one or more left attachment openings.

13. The ladder of claim 12 further comprising:

one or more first fasteners extending through the one or more right attachment openings of the right metal plate, the right side flange, and the right front rail and/or right rear rail; and one or more second fasteners extending through the one or more left attachment openings of the left metal plate, the left side flange, and the left front rail and/or left rear rail.

14. The ladder of claim 12 wherein the right side flange is intermediate the right side plate and the right front rail and right rear rail; and wherein the left side flange is intermediate the left side plate and the left front rail and left rear rail.

15. The ladder of claim 12 wherein the right side plate includes a protrusion extending along the right rear rail, the one or more right attachment openings including a right attachment in the protrusion.

16. A ladder comprising:

a front assembly having a right front rail and a left front rail in parallel and spaced relation with the right front rail, front rungs attached to the right front rail and the left front rail and disposed between the right front rail and the left front rail;

a rear assembly having a right rear rail and a left rear rail in parallel and space relation with the right rear rail, rear rungs attached to the right rear rail and the left rear rail and disposed between the right rear rail and the left rear rail; and a ladder top mounted to upper end portions of the front assembly and the rear assembly, the ladder top including a wall having one or more reinforcing portions defining attachment openings for removably attaching items to the ladder top.

17. The ladder of claim 16 wherein each reinforcing portion extends about the entire circumference of the respective attachment opening.

18. The ladder of claim 16 wherein the wall is a front side flange of the ladder top extending downward from an upper wall of the ladder top, the one or more reinforcing portions at an end opposite the upper wall.

19. The ladder of claim 16 wherein the ladder top includes a paint bucket hook defining a passage therethrough.

20. The ladder of claim 16 wherein the ladder top includes a right metal plate at a right side of the ladder top; and a left metal plate at a left side of the ladder top.

* * * * *